Dec. 25, 1928.

F. F. FOGEL

BATTERY TERMINAL

Filed July 6, 1926

1,696,568

Inventor
F. F. Fogel,

By Clarence A. O'Brien
Attorney

Patented Dec. 25, 1928.

1,696,568

UNITED STATES PATENT OFFICE.

FRED F. FOGEL, OF HAWARDEN, IOWA.

BATTERY TERMINAL.

Application filed July 6, 1926. Serial No. 120,727.

This invention relates to battery terminals for use in the anchoring of electric cables to battery posts, and has for its primary object to provide such a terminal wherein the cable may be positively connected thereto without requiring the soldering of the wires of the cable to said terminal.

An additional object of the invention resides in the provision of such a terminal wherein the cable may be removed from the battery post without requiring the entire removal of the terminal which is usually a very difficult performance frequently resulting in the breaking of the post clamping ring or the stripping of the clamping ring bolt threads.

Other objects will become apparent as the nature of the invention will be better understood, the same comprising the novel form, combination, and arrangement of parts hereinafter more fully described, shown in the accompanying drawing and claimed.

In the drawing wherein like numerals indicate like parts throughout the several views.

Figure 1:
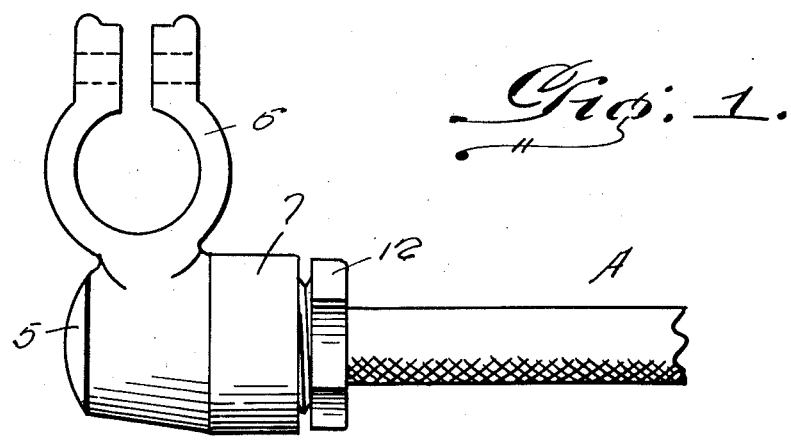
Figure 1 is a plan view of a battery terminal constructed in accordance with the present invention.

Now having particular reference to the drawing, my novel terminal constitutes a metallic socket member 5 upon one side of which is formed a conventional battery post securing split clamp 6. The closed end of the socket member is tapered both internally and externally, although the external chamber need not be provided with the same. The outer open end of the socket member is cylindrical and is internally screw threaded as at 7.

The terminal further constitutes a tapered wedge sleeve 8 and a compression gland 9, said wedge sleeve being longitudinally split as at 10, and tapered only in so far as the exterior surface is concerned. The compression gland 9 is formed externally with screw threads 11 while at the outer end thereof is a squared hexagon or octagon head 12 to permit the turning of the gland into or out of the internally threaded end of the socket member 5.

Figure 2:
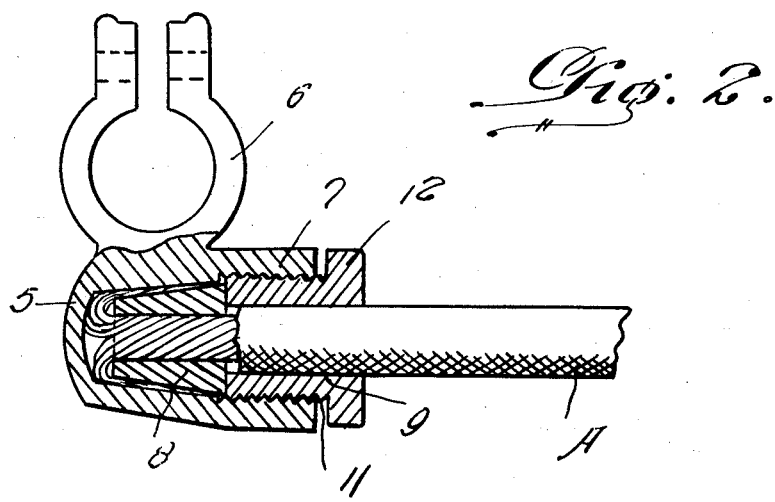
Figure 2 is a detail section thereof.
Figure 3:
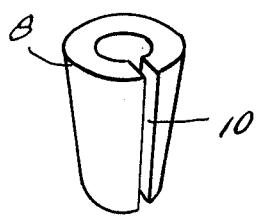
Figure 3 is a perspective of a wedge sleeve that forms an important part of the present invention.

In actual practice the insulation is removed from the terminal attaching end of the electric cable A as indicated in Figure 2. The compression gland 9 is then slipped over this end of the cable after which the wedge sleeve 8 is disposed upon the bare end of the cable. The wire strands are then uncoiled and turned backward over the tapered surface of the sleeve, also as indicated in Figure 2. The end of the cable is then inserted within the socket member 5 after which the compression gland 9 is screwed inwardly of the socket, obviously forcing the wedge sleeve tightly within the socket which will firmly clamp the turned over ends of the wire strands between the wall of the socket and the exterior of the sleeve, thus providing a positive electrical connection between the terminal and said cable.

Obviously, when it is desired to remove the cable from the battery all that is necessary is to unthread the gland from the socket member and then pull the cable therefrom.

It will be obvious that I have provided a highly novel, simple, and efficient form of battery terminals that is well adapted for all the purposes heretofore designated, and even though I have herein shown and described the preferred embodiment of the invention it is nevertheless to be understood that minor changes may be had without departing from the spirit and scope of the appended claim.

Having thus described the invention, what I claim as new and desire to secure by Letters Patent is:—

A battery terminal comprising a post engaging clamp and a body associated therewith provided with a socket having inwardly tapered walls, the inner end of said socket being closed and its outer end being internally screw-threaded, an externally tapered sleeve loosely disposed in said socket and having a single longitudinal split whereby it is made resilient, an electrical conductor formed of a series of strands disposed through the sleeve and having the free ends of the strands reversely bent over the inner edge of the sleeve and disposed to lie for a substantial distance between and to be engaged by the tapered surfaces of the sleeve and socket, and a second sleeve disposed over the conductor and having external screw-threads engaging with the screw-threads of the socket, the inner edge of the last named sleeve being adapted to engage the outer edge of the split sleeve to force the latter inwardly, whereby to bind the periphery of the conductor and to grip the free ends of the strands between the periphery of the split sleeve and the inner circumferential wall of the socket.

In testimony whereof I affix my signature.

FRED F. FOGEL.